United States Patent [19]

Lauffenburger et al.

[11] 3,976,313
[45] Aug. 24, 1976

[54] LAUFFEN SAFETY LOCKING DEVICE FOR A COUPLING

[75] Inventors: Robert F. Lauffenburger, Warren; Edmund H. Waszkiewicz, Erie, both of Pa.

[73] Assignee: Edmund H. Waszkiewicz, Erie, Pa.

[22] Filed: June 13, 1975

[21] Appl. No.: 577,367

[52] U.S. Cl. ................ 285/84; 285/312; 285/313
[51] Int. Cl.² ........................................ F16L 37/18
[58] Field of Search .......... 285/320, 84, 82, 85, 285/87, 88, 313, 312, 311, 81; 403/315, 316, 317, 318, 319

[56] References Cited
UNITED STATES PATENTS

| | | | |
|---|---|---|---|
| 1,086,312 | 2/1914 | Blaha | 285/320 |
| 3,077,330 | 2/1963 | Lamphear | 285/320 X |
| 3,124,374 | 3/1964 | Krapp | 285/85 |
| 3,445,127 | 5/1969 | Clarke | 285/320 X |

*Primary Examiner*—Thomas F. Callaghan

[57] ABSTRACT

A coupling is disclosed made up of a female member and a male member adapted to fit together. The male member has an outer peripheral groove and the female member has fastening means including levers swingably connected to it. The levers can swing into alignment with the axis of the coupling to clamp the male member firmly against the seal in the female member. An improved arrangement is provided for holding the levers in place. The arrangement includes spring loaded detent balls in countersinks. The balls project out the side of ears next to the levers. The spring may be leaf springs overlying the detent balls, urging the detent balls into engagement with chamfered edges of the levers. The detent balls prevent the levers from inadvertently rotating to release the coupling due to vibration or ther reasons.

2 Claims, 7 Drawing Figures

U.S. Patent   Aug. 24, 1976   3,976,313
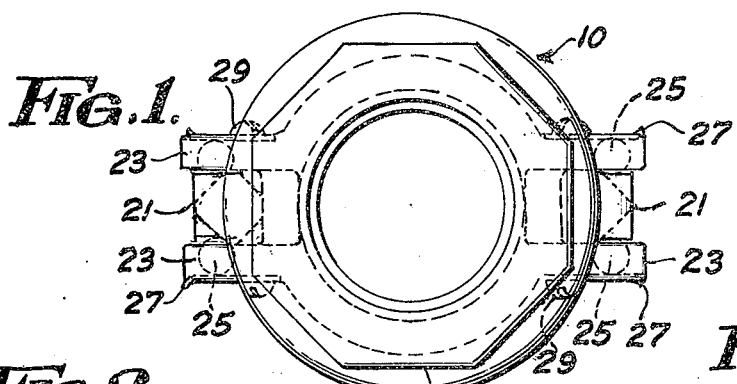
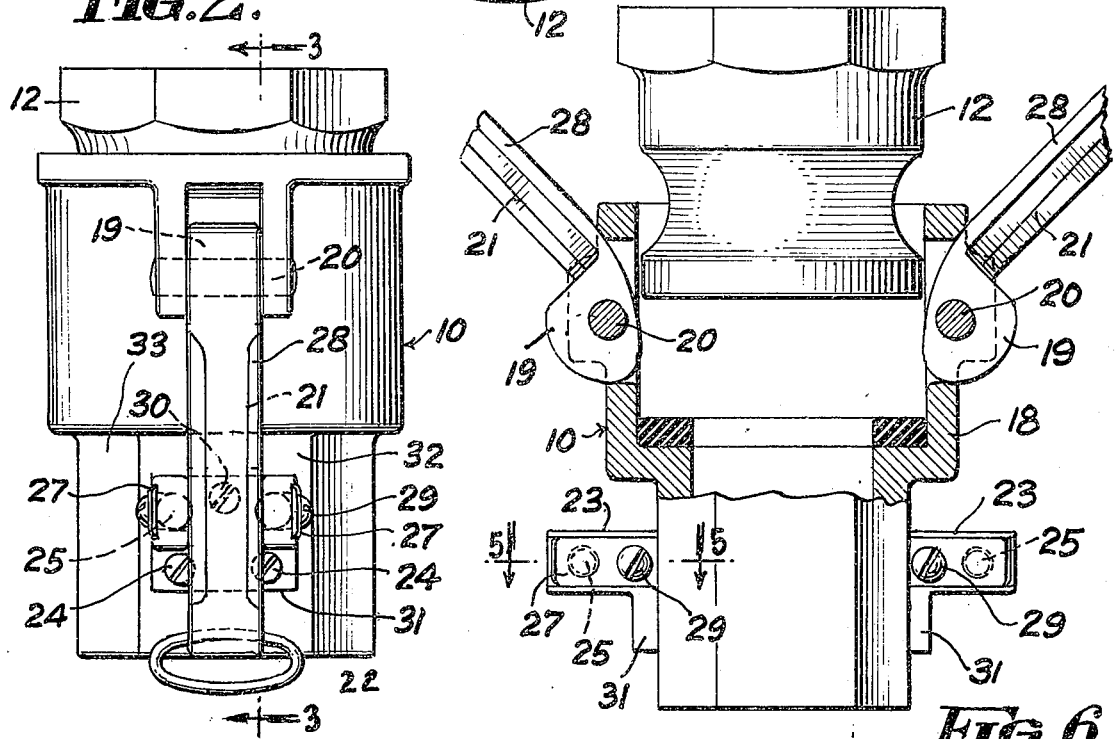
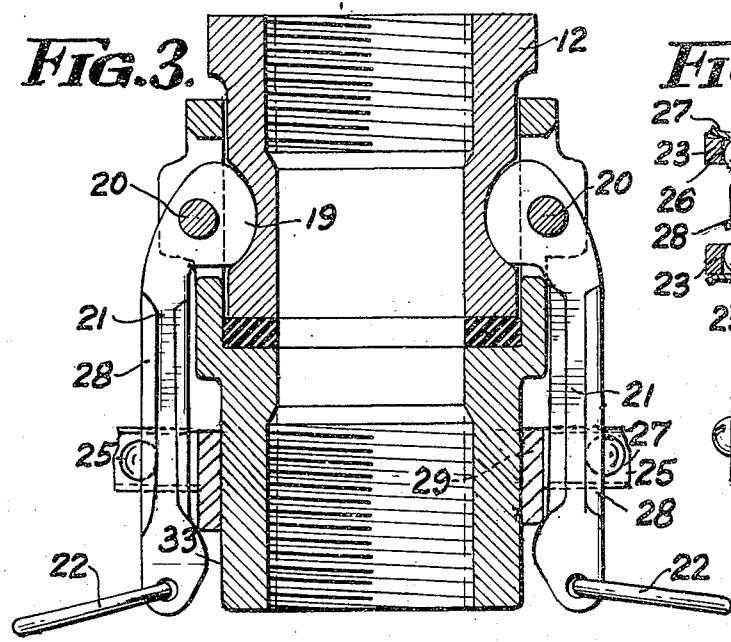
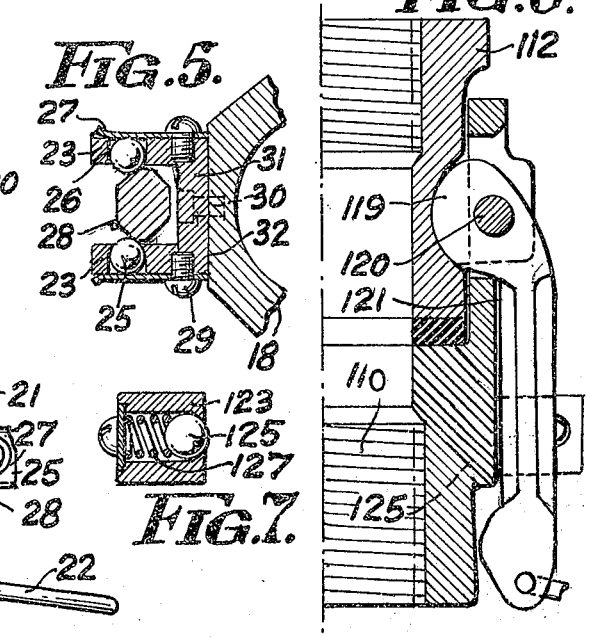

LAUFFEN SAFETY LOCKING DEVICE FOR A COUPLING

REFERENCE TO PRIOR ART

Various couplings of the type disclosed herein have been proposed and the problem of a cam inadvertently coming loose has been recognized in the prior art, for example, in U.S. Pat. No. 3,124,374.

This patent discloses a locking device for holding a cam operating lever. Applicant's detent means is totally different from the locking device provided in this patent in that in addition to the clamping levers on the couplings, applicant has provided an improved detent, which may be integral with the coupling or it may be attached to existing couplings or it may be selectively attached only to couplings subjected to vibration or other conditions where a detent is required to hold the lever against inadvertent release. Applicant's ball has a smooth action and is much smoother in function than the references shown in the prior art.

OBJECTS OF THE INVENTION

It is an object of the invention to provide an improved coupling and detent combination.

Another object of the invention is to provide an improved coupling and a detent that may be removably and selectively attached to existing couplings that were intended for use without detents.

Another object of the invention is to provide a coupling and detent combination that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, gauge and minor details of construction without departing from the spirit or sacrificing any of the advantages of the invention.

GENERAL DESCRIPTION OF DRAWINGS

FIG. 1 is a top view of the coupling according to the invention.

FIG. 2 is a side view of the coupling.

FIG. 3 is a cross sectional view taken on line 3—3 of FIG. 2.

FIG. 4 is a view partly in cross section of the detent holder, showing the cam in open position.

FIG. 5 is an enlarged cross sectional view of the detent holder.

FIG. 6 is a partial longitudinal cross sectional view of another embodiment of the invention.

FIG. 7 is a cross sectional view similar to FIG. 5 of the embodiment shown in FIG. 6.

DETAILED DESCRIPTION OF THE DRAWING

Now with more particular reference to the drawing, the coupling, generally indicated at 10 is generally like that shown in the male member of U.S. Pat. No. 3,124,374, having a hollow plug member 12 that is received in the opening of a hollow female member 18. The male member has a peripheral groove.

The cams 19 in the example shown, are pivotally connected to the female member by means of pins 20, and levers 21 are fixed to the cams 19 and can be rotated to move the cam out of engagement with the male member and thereby release the male from the female member. The levers 21 can be swung from a position generally perpendicular to the central axis of the female member to a position in alignment with the central axis of the female member as shown in FIG. 2.

The levers 21 may have an opening in the distal end thereof which receives a suitable ring 22, forming a convenient means for grasping the lever 21 to move it.

The ears 23 are integral with flanges 31 and are provided with suitable openings that receive the cap screws 24, which clamp the ears 23 to the female member 18.

A detent ball 25 is received in each countersink 26 in the ears 23 and a leaf spring 27 overlies the ball 25 and urges it over chamfer 28 on the lever 21. A notch or even a straight edge could be used instead of a chamfer. Each leaf spring 27 is held to the ear by means of the screw 29. Each spring 27, therefore acts as a retaining means for holding the detent ball in the countersink 26 and also as a resilient means for urging the ball 25 over chamfered edge 28 to hold the lever 21 in position.

The bracket members are made up of the spaced ears 23 fixed to the flanges 31. The flange 31 and ears 23 have a flat surface 32 that rests on the flat hex surface 33 of the female member. The screws 24 engage the female member and clamp the bracket member 31 to it. A central screw 30, extending through the intermediate member 32, between the ears, further rigidly holds the bracket member in place. Balls 25 are disposed in the counterbored openings 26. The counterbored openings are smaller on the side adjacent the lever than on the outside so that the balls 25 are retained in the openings 26 when the lever 21 is swung out, as shown in FIG. 4.

When the lever 21 is swung into position between the ears 23, the detent balls 25 overlie the chamfered edges 28, thereby retaining the lever in position and holding it from disconnection due to vibration.

In the embodiment of the invention shown in FIGS. 6 and 7, a male member 112 is received in the female member at 110. The cams 119 are pivotably supported on the pins 120 and are integrally connected to the lever 121 which is held between the ears in the manner shown in the other embodiments, by means of the detent ball 125.

The ears 123 are integrally attached to the side of the female member and the detent balls 125 are received in counterbored holes between the ears. A coil spring 127 urges the balls 125 into engagement with the lip inside the end of the countersink and the screw holds the spring in place over the countersunk hole, as shown in FIG. 7, thereby holding the ball 125. The screw heads holds the plate over the spring 127 in the same manner that the plates in the embodiment of FIG. 5 are held in place.

It will be seen that in applications where a detent is not necessary, the detent can be left off and in applications where a holding means for the lever is desirable, the detent and ear 23 can be applied to the existing equipment. The flange and ears could all be cast integral with the coupling.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a separable coupling and a safety lock, said coupling comprising a hollow plug member having an external peripheral groove therein, a hollow female socket member receiving said hollow plug member, a seal means in said hollow female member adapted to engage said plug member forming a seal therebetween, elongated levers rotatably supported on said female member said levers having cam means adapted to engage said peripheral groove in said plug member for urging said plug into sealing engagement with said seal, a bracket, said bracket having two spaced ears, a flange connecting said ears together, means extending through said flange removably fixing said bracket to a side of said female member, a counterbored hole in each said ear with a detent ball therein, said balls extending into the space between said ears, one of said levers being adapted to swing into said space between said ears, said detent balls overlying and engaging the external surface of said lever whereby said lever is restrained from moving with said cam to disengage said plug, two leaf springs, each said leaf spring being adapted to rest on the outside of a said ear overlying said counterbored openings therein engaging said detent ball, and a screw extending through each said spring and threadably engaging said ear, clamping said spring to said bracket whereby said detent balls are urged into said opening.

2. The combination recited in claim 1 wherein said female member has a polygonal shape having flat surfaces and said bracket supported on one of the flat surfaces.

* * * * *